United States Patent [19]
Happer

[11] 4,269,231
[45] May 26, 1981

[54] BELOW SURFACE DUCTING
[75] Inventor: George T. Happer, London, England
[73] Assignee: Happer Systems Limited, London, England
[21] Appl. No.: 59,612
[22] Filed: Jul. 23, 1979
[30] Foreign Application Priority Data
Jul. 28, 1978 [GB] United Kingdom ............... 31520/78
[51] Int. Cl.³ .............................................. F16L 55/10
[52] U.S. Cl. ..................................... 138/92; 138/104; 138/116; 138/162; 174/97
[58] Field of Search ................. 138/92, 115, 116, 117, 138/157, 162, 104; 174/48, 97, 68 C, 101

[56] References Cited
U.S. PATENT DOCUMENTS 3,420,017  1/1969  Brugger et al. ................... 138/116 X
3,745,229  7/1973  de Vos .............................. 138/116 X
3,769,445 10/1973  Bregenzer ........................... 174/97 X
3,927,698 12/1975  Johannsen ............................. 138/162

Primary Examiner—Frederick R. Schmidt
Attorney, Agent, or Firm—Fleit & Jacobson

[57] ABSTRACT

Ducting for installing below a surface, which ducting comprises a body portion and a lid, the body portion having a first longitudinal channel, a pair of second longitudinal channels arranged one on each side of the first channel, and at least two separate channel insert members which are a removable fit in the first channel and which are for receiving elongate members, the lid having retainer means for clipping in the second channels, each channel insert member having base and side walls, and the channel insert members occupying substantially the entire cross-sectional area of the first channel.

9 Claims, 11 Drawing Figures

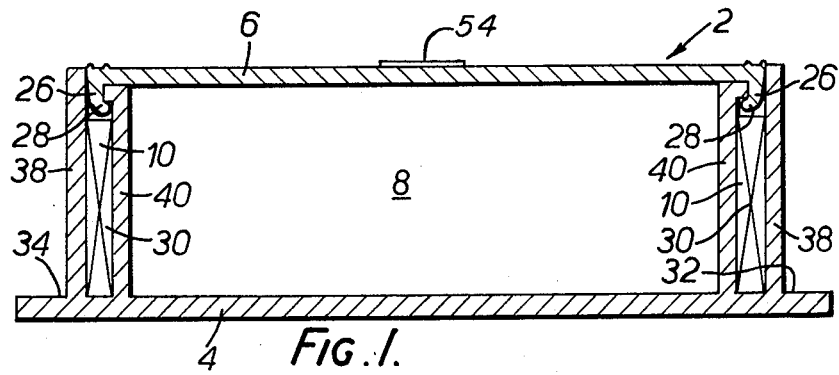
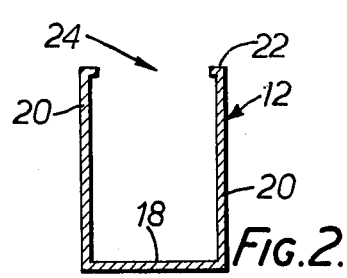
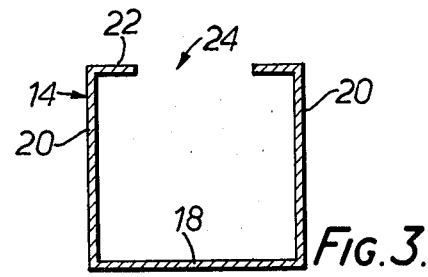
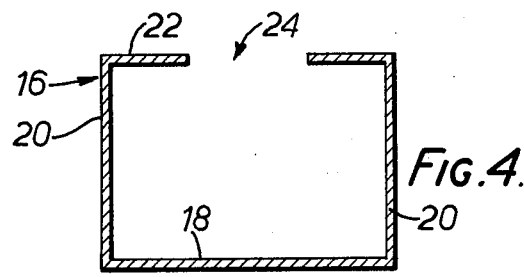
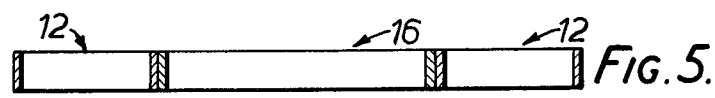

BELOW SURFACE DUCTING

This invention relates to ducting for installing below a surface of a basic substrate material. The surface will usually be the surface of a floor but it can also be the surface of a wall or a ceiling. Usually, the ducting will be installed in the basic substrate material to be flush with the adjacent and surrounding basic substrate material. The basic substrate material and therefore the ducting can then be covered, if desired, with a surface lying material such as a carpet in the case where the basic substrate material is a floor.

Accordingly, this invention provides ducting for installing below a surface, which ducting comprises a body portion and a lid, the body portion having a first longitudinal channel, a pair of second longitudinal channels arranged one on each side of the first channel, and at least two separate channel insert members which are a removable fit in the first channel and which are for receiving elongate members, the lid having retainer means for clipping in the second channels, each channel insert member having base and side walls, and the channel insert members occupying substantially the entire cross-sectional area of the first channel.

The ducting of the present invention is advantageous in that the channel insert members may be installed in the first channel in different lengths to stagger the various joints between in-line channel insert members and the joints between the body portions. This acts to prevent or reduce the ingress of moisture into the ducting and this is especially advantageous where the ducting is laid on a structural surface prior to wet screeding for example with concrete. The ducting can safely be employed as a screed bar so that the screed falls flush with the surface of the ducting.

The joints between various parts of the ducting can be simple butt joints. Where the ducting is made from expandible materials, the butt joints will allow for this expansion. The butt joints may be sealed with a moisture repelling material such for example as a non-setting mastic composition. It will be apparent that butt joints are far simpler to produce than joints requiring complex coupling members or other arrangements. Also, these coupling members may increase the thickness of the ducting and this is often not satisfactory because, for example, a greater depth of screed is required to accommodate the coupling members. Again, the coupling members may decrease the available space inside the ducting and this is also not satisfactory because it lessens the available space for the elongate members.

Because the channel insert members provide strength by their own construction, the body portion need not be so thickly constructed as it would have to be if the channel insert members were not present or were of a different design.

The elongate members which are to be inserted into the channel insert members may be, for example, electrical cables, electrical wires and pipes.

Preferably, the first channel is defined by a pair of walls which each have an outwardly projecting lug which is adapted to be engaged by the retainer means on the lid.

The retainer means on the lid may be a pair of ribs each terminating in an inwardly projecting lug. When the lid has been clipped in position on the body portion, it can then be removed by an inward deformation or flexing of the walls defining the first channel. Obviously, inward deflection is relatively easy to achieve since the ducting will in use be below the surface of a basic substrate material and this material will act to prevent any outward deflection of the side walls of the body portion.

Preferably, the lid is adapted to be a flush fit with the top of the side wall of the body portion in order to avoid the possible ingress of moisture or dirt.

Preferably, these are three channel insert members but it is to be appreciated that more than three channel insert members can be employed if desired. Usually, the channel insert members will be of different cross sectional widths and they will be designed to receive different types of elongate members. Thus, for example, one channel insert member may be for receiving cables for computers and another channel insert member may be for receiving Post Office cables.

Preferably, each channel insert member has the base and side walls and a top wall, the top wall having a longitudinal slot for enabling access to be gained to the elongate members. Advantageously, the longitudinal slot will be the same width for all the channel insert members. The slot width can then be chosen to be such that any cut out portion of the lid effected after the ducting has been laid, for example for the purpose of connecting an upstanding electrical box to electrical cables in the ducting, will not fall into the interior of the channel insert members. The top wall of each channel insert member also acts to support the lid when persons are walking on the ducting.

Upstanding electrical boxes may be located on the body portion by inserting fixing means such for example as screws or nails into the second channels. The fixing means will usually bite into the walls defining the second channels. If desired however, infill members may be provided in the second channels, the fixing means then being able to bite into these infill members. The infill members can also advantageously act to give rigidity to the ducting at parts where two separate pieces of ducting are joined together. In addition to giving rigidity by bridging a normal butt joint, the infill members can also complement the action of a joint sealing material in preventing the ingress of moisture into the ducting, for example when a screed is being laid around the ducting as mentioned above.

The ducting may be secured in position using a suitable adhesive. Alternatively, the body portion may be provided with a pair of fixing flanges. Advantageously, the flanges are clamped in position by clamps which overlap the flanges, and act to provide firm downward fixing but allowing adequate longitudinal movement for any thermal expansion of the ducting.

Since the ducting will usually be completely hidden from sight, it is advantageous to provide the ducting with locating means for enabling the ducting to be located when it is hidden from view. The ducting can be made of various materials and if it is made of a plastics material such for example as unplasticised polyvinyl chloride, then the locating means will be electrically conducting. If the ducting is made of a metal, then the locating means will be non-electrically conducting. Preferably, the locating means is provided on the lid of the ducting and is usually positioned along the centre of the lid. Advantageously, the locating means takes the form of an adhesive tape, for example, a self-adhesive electrically conducting tape.

When the ducting is made of plastics materials, the various parts of the ducting may be made in any desired manner. The lid and the body portion may be extruded. When the channel insert members have the slotted top wall, they may be formed with the slot in the top wall or they may be formed with a weakened strip in the top wall which is subsequently ripped out to form the slot.

Embodiments of the invention will now be described solely by way of example and with reference to the accompanying drawings in which:

FIGS. 1 to 4 show first below surface ducting in accordance with the invention;

FIGS. 5 to 7 show three alternative combinations of channel insert members;

Figure 8:
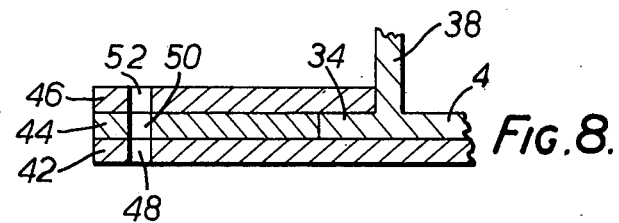
FIGS. 8 and 9 show a first clamping arrangement for clamping the ducting in position.

Referring to FIGS. 1 to 4, there is shown ducting 2 for installing below the surface of a basic substrate material in the form of a floor. The ducting 2 comprises a body portion 4 and a removable lid 6.

The body portion 4 has a first longitudinal channel 8 and a pair of second longitudinal channels 10 arranged one on each side of the first channel 8. The body portion 4 also has three separate channel insert members 12, 14, 16 which are shown in FIGS. 2, 3 and 4 respectively and which are a removable fit in the first channel 8 if used in the correct combination. The channel insert members 12, 14, 16 are for receiving elongate members such for example as cables, pipes and the like. The channel insert members 12, 14, 16 have base walls 18, side walls 20 and top walls 22. The top walls 22 are each provided with a longitudinal slot 24 for enabling access to be gained to the elongate members in the channel insert members 12, 14 and 16. The slots 24 are arranged to be all the same size and further of a size that prevents standard cut-out portions of the lid 6 from falling into the channel insert members 12, 14, 16. The channel insert members 12, 14, 16 are in widths in the ratio of 1:1.5:2. All three combinations of the channel insert members 12, 14, 16 therefore add up to 4 which, subject to working clearance, must also be the relative internal width of the first channel 8.

The lid 6 is fixed in position on the body portion 4 by retainer means formed on the lid 6. These retainer means are constituted by a pair of ribs 26 each having an inwardly projecting lug 28.

Upstanding electrical boxes can be fixed to the body portion 4 by means of screws, nails or other fixing means passing into the second channels 10. In order to provide a good grip for the screws, nails or other fixing means, infill members 30 are preferably inserted into the second channels 10. The infill members 30 also act as bridging members between adjacent ends of sections of the body portion 4. This gives rigidity to the joint and can help to stop the ingress of moisture into the ducting 2 at the joint. The joints can also be sealed with water-repellent materials such for example as a non-setting mastic composition.

As an alternative to fixing the body portion 4 in position using a suitable adhesive, the body portion 4 may be provided with flanges 32, 34. Advantageously, the flanges 32, 34 are clamped in position by clamps (see FIGS. 8 to 11) which overlap the flanges 32, 34 and act to provide firm downward fixing by allowing adequate longitudinal movement for any thermal expansion of the ducting.

Referring now to FIGS. 5, 6 and 7 there are shown three alternative arrangements of channel insert members. In FIG. 5, there are two channel insert members 12 and a centrally-positioned channel insert member 16. In FIG. 6 there are two channel insert members 14 and a centrally-positioned channel insert member 12. In FIG. 7 there are only two channel insert members 16. It will be noted that whatever combination of channel insert members 12, 14, 16 is employed, they all fit snugly into the first channel 8 in the body portion 4.

Figure 9:
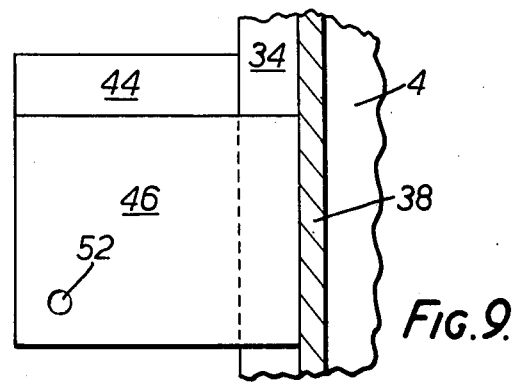

Referring now to FIGS. 8 and 9, a part of the ducting 2 illustrated in FIG. 1 is shown positioned on a packing member 42. A clamping member 44 rests on the packing member 42 and it abuts against the end of the flange 34. A clamping member 46 rests on the clamping member 44 and also rests on the flange 34. The members 42, 44, 46 are provided with apertures 48, 50, 52 respectively. These apertures 48, 50, 52 line up as shown in FIG. 8 and a screw or a nail can pass along the apertures to fix the clamping members 44, 46 in position such that they firmly locate the ducting 2 against vertical and sideways movement but allow longitudinal movement caused by any expansion and contraction of the body portion 4. Usually, once the body portion 2 has expanded to the normal occupation temperature of the building in which it is installed, little further expansion and contraction takes place.

Figure 10:
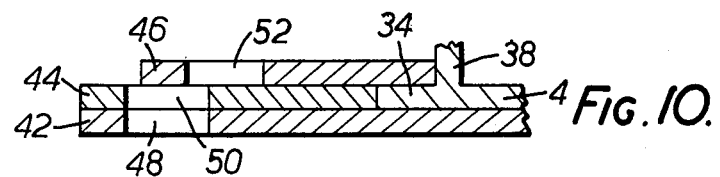
FIGS. 10 and 11 show a second clamping arrangement for clamping the ducting in position.
Figure 11:
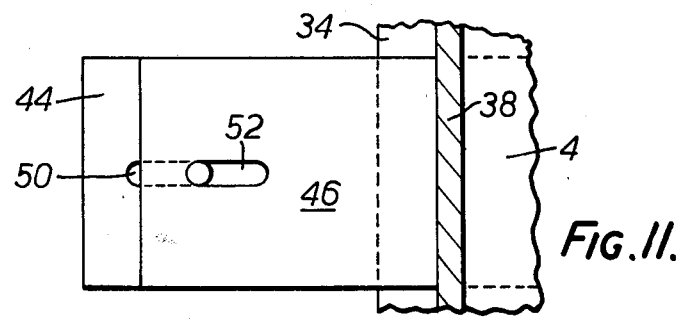

In FIGS. 10 and 11, similar parts as in FIGS. 8 and 9 have been given the same reference numeral and their precise construction and operation will not again be given. In FIGS. 10 and 11, the apertures 48, 50, 52 are formed as slots which allow for appropriate adjustments or positioning of the members 42, 44, 46.

It is to be appreciated that the embodiments of the invention described above have been given by way of example only and that modifications may be effected. Thus, for example, various electrical connecting boxes can be positioned on the lid. Also, a different type of retainer means could be employed for the lid 6 and the lid 6 could be slightly proud of the body portion 4 although it is preferably a flush fit with the side walls 38 of the body portion 4 as is illustrated in FIG. 1. When the lid 6 is a flush fit with the side walls 38, it will be seen that these side walls 38 extend above the adjacent inner walls 40 and this construction enables a wet screed (not shown) to be brought flush with the top of the side walls 38 without moisture gaining access to the first channel 8. This construction also enables the lid to reinforce the side walls 38 against inward pressure from the screed. If the lid 6 is proud of the body portion 4, it will usually extend over the side walls 38. The lid 6 does not have to be removable and it can be fixed in position if desired. Also, two pairs of longitudinal flutes can be provided on the lid 6 to indicate the centre of the channels 10 for the screws, nails or other fixing means. These flutes can also facilitate the centering of pilot drill bits employed for the purpose of providing pilot holes for the screws. The depths of the lid 6 and/or the body portion 4 can be varied to vary the capacity of the ducting 2. The packing members 42 illustrated in FIGS. 8 to 11 can be omitted if desired. The lid 6 may be provided with locating means in the form of a strip of electrically conducting material 54 for enabling the ducting to be located when it is hidden from view.

We claim:

1. Ducting for installing below a surface, which ducting comprises a body portion and a lid, the body portion having a first longitudinal channel, a pair of second longitudinal channels arranged one on each side of the first channel, and at least two separate channel insert members which are a removable fit in the first channel and which are for receiving elongate members, the lid having retainer means for clipping in the second channels, each channel insert member having base and side walls, and the channel members occupying substantially the entire cross-sectional area of the first channel.

2. Ducting according to claim 1 in which the first channel is defined by a pair of walls which each have an outwardly projecting lug which is adapted to be engaged by the retainer means on the lid.

3. Ducting according to claim 2 in which the retainer means on the lid are a pair of ribs each terminating in an inwardly projecting lug.

4. Ducting according to any one of the preceding claims in which the lid is a flush with the top of the side wall of the body portion.

5. Ducting according to claim 1, claim 2 or claim 3 in which there are three channel insert members.

6. Ducting according to claim 1, claim 2 or claim 3 in which each channel insert member has the base and side walls and a top wall, the top wall having a longitudinal slot for enabling access to be gained to the elongate members.

7. Ducting according to claim 1, claim 2 or claim 3 in which each channel insert member has the base and side walls and a top wall, the top wall having a longitudinal slot for enabling access to be gained to the elongate members, and including infill members in the second channels.

8. Ducting according to claim 1, claim 2 or claim 3 including locating means for enabling the ducting to be located when it is hidden from view.

9. Ducting according to claim 8 which is made of a plastics material, and in which the locating means is a strip of electrically conducting material provided on the lid of the ducting.

* * * * *